US009873225B2

United States Patent
Klinstein et al.

(10) Patent No.: US 9,873,225 B2
(45) Date of Patent: Jan. 23, 2018

(54) ENERGY DIRECTOR JOINT DESIGN FOR ULTRASONIC WELDING OF THERMOPLASTICS

(71) Applicant: Dukane Corporation, St. Charles, IL (US)

(72) Inventors: Leo Klinstein, Glenview, IL (US); Paul Golko, Crystal Lake, IL (US); Miranda Bair Marcus, Columbus, OH (US)

(73) Assignee: Dukane IAS, LLC, St. Charles, IL (US)

( * ) Notice: Subject to any disclaimer, the term of this patent is extended or adjusted under 35 U.S.C. 154(b) by 84 days.

(21) Appl. No.: 14/500,416

(22) Filed: Sep. 29, 2014

(65) Prior Publication Data

US 2015/0129110 A1    May 14, 2015

Related U.S. Application Data

(60) Provisional application No. 61/902,830, filed on Nov. 12, 2013.

(51) Int. Cl.
 *B29C 65/00* (2006.01)
 *B29C 65/08* (2006.01)
 (Continued)

(52) U.S. Cl.
 CPC ............ *B29C 65/08* (2013.01); *B29C 66/112* (2013.01); *B29C 66/114* (2013.01);
 (Continued)

(58) Field of Classification Search
 CPC ......... B29C 65/00; B29C 65/08; B29C 66/00; B29C 66/112; B29C 66/114;
 (Continued)

(56) References Cited

U.S. PATENT DOCUMENTS 3,850,776 A    11/1974 Karobath
5,730,832 A    3/1998 Sato
(Continued)

FOREIGN PATENT DOCUMENTS

CN    201064946 Y    5/2008
DE    3929710 A1    3/1991
(Continued)

OTHER PUBLICATIONS

International Search Report, PCT/US2014/58027, 4 pages, dated Feb. 10, 2015.
(Continued)

*Primary Examiner* — Jacob T Minskey
*Assistant Examiner* — Matthew Hoover
(74) *Attorney, Agent, or Firm* — Nixon Peabody LLP (57) ABSTRACT

An ultrasonic welding system and method for joining first and second thermoplastic parts includes least one energy director formed on at least one surface of the first thermoplastic part, with the energy director projecting from the surface of the first thermoplastic part toward an opposed surface of the second thermoplastic part. The distal end portion of the energy director has a curved or flat surface that initially engages the opposed surface of the second thermoplastic part when the first and second parts are brought into engagement with each other. The first and second thermoplastic parts are ultrasonically welded by pressing the parts together while vibrating at least the first part in a direction parallel to the direction of projection of the energy director. The energy director may include a pair of substantially flat side walls joined to opposite ends of the curved or flat end surface.

13 Claims, 7 Drawing Sheets

(51) Int. Cl.
*B29K 101/12* (2006.01)
*B29K 105/00* (2006.01)

(52) U.S. Cl.
CPC ...... *B29C 66/30223* (2013.01); *B29C 66/542* (2013.01); *B29C 66/73921* (2013.01); *B29C 66/8322* (2013.01); *B29C 66/92615* (2013.01); *B29C 66/92921* (2013.01); *B29C 66/1222* (2013.01); *B29C 66/1224* (2013.01); *B29C 66/24221* (2013.01); *B29C 66/24244* (2013.01); *B29C 66/71* (2013.01); *B29C 66/8246* (2013.01); *B29K 2101/12* (2013.01); *B29K 2105/253* (2013.01); *B29K 2105/256* (2013.01)

(58) Field of Classification Search
CPC ............ B29C 66/30223; B29C 66/542; B29C 66/73921; B29C 66/8322; B29C 66/92615; B29C 66/92921; B29C 66/10; B29C 66/30; B29C 66/50; B29C 66/70; B29C 66/80; B29C 66/90
See application file for complete search history.

(56) References Cited

U.S. PATENT DOCUMENTS

| | | | | |
|---|---|---|---|---|
| 8,052,816 B2* | 11/2011 | Klinstein | ................ | B29C 65/08 156/64 |
| 8,360,300 B1* | 1/2013 | Strotmann | ........... | B23K 20/106 228/1.1 |
| 2006/0143642 A1* | 6/2006 | Kawasaki | .......... | G11B 23/0021 720/738 |
| 2008/0210360 A1* | 9/2008 | Soccard | ................. | B29C 65/08 156/73.4 |
| 2010/0147466 A1 | 6/2010 | Sans Marimon | | |
| 2011/0174423 A1 | 7/2011 | Touchet | | |
| 2012/0125521 A1 | 5/2012 | Dersch | | |

FOREIGN PATENT DOCUMENTS

| | | |
|---|---|---|
| DE | 102010003268 A1 | 9/2011 |
| EP | 0168750 A1 | 1/1986 |
| EP | 0661208 A1 | 7/1995 |
| EP | 1072391 A2 | 1/2001 |
| EP | 2202117 A1 | 6/2010 |
| GB | 1047295 A | 11/1966 |
| JP | 59016495 A | 1/1984 |
| WO | WO 2006/128246 A1 | 12/2006 |
| WO | WO 2013/053588 A1 | 4/2013 |

OTHER PUBLICATIONS

International Written Opinion, PCT/US2014/58027, 5 pages, dated Feb. 10, 2015.
European Patent Office, Extended European Search Report for Application No. EP 14861847.3, dated Jun. 19, 2017 (13 pages).
Volkov, S. S.; "Effect of dimensions of the gap between the edges on the strength of ultrasound welded joints in rigid plastics"; Welding Intl., vol. 17, No. 6, pp. 482-486; Taylor & Francis, Abingdon, UK; Jan. 1, 2003; XP001167971; ISSN: 0950-7116 (5 pages).

* cited by examiner

ENERGY DIRECTOR JOINT DESIGN FOR
ULTRASONIC WELDING OF
THERMOPLASTICS

CROSS REFERENCE TO RELATED
APPLICATION

This application claims the benefit of U.S. Provisional Patent Application No. 61/902,830, filed Nov. 12, 2013, which is hereby incorporated by reference in its entirety.

FIELD OF THE INVENTION

This invention relates to ultrasonic welding of thermoplastics, particularly to the design of the weld joint.

BACKGROUND

One of the commonly used methods for joining thermoplastic parts is ultrasonic welding, which involves melting of the mating part surfaces by means of high-frequency, small-amplitude vibrations while the parts are pressed together. When a sufficient amount of melting has occurred, the ultrasonic vibrations are terminated and the plastic solidifies while the compressive force on the parts is maintained, producing a permanent assembly. Ultrasonic welding offers a number of advantages over other joining methods, including speed, flexibility, cleanliness, and low cost.

A key consideration in the successful use of ultrasonic welding is the design of the weld joint; namely, the geometries of those areas of the parts to be joined which are melted during the welding process. A number of different weld joint designs are known to those skilled in the art, each suited for the purpose of meeting specific weld criteria or to facilitate welding of certain materials.

Figure 1:
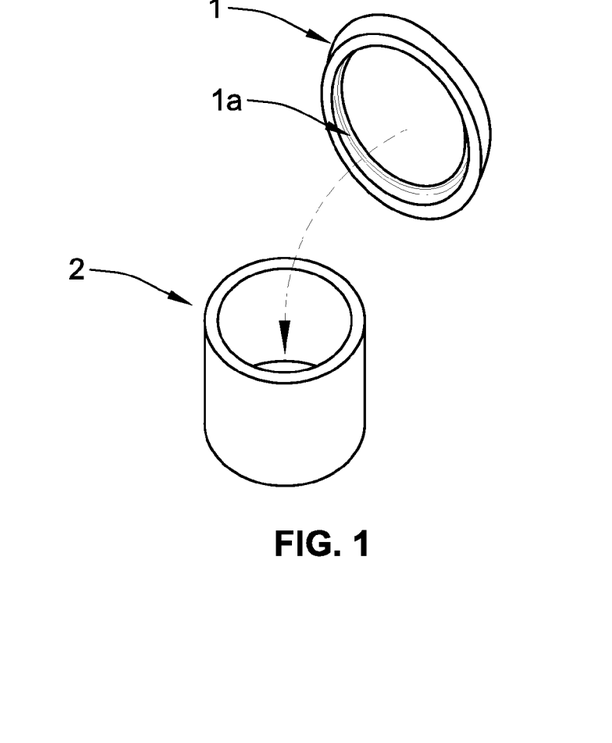
FIG. 1 is an exploded perspective view of parts for ultrasonic welding, one of which contains a triangular energy director.
Figure 2:
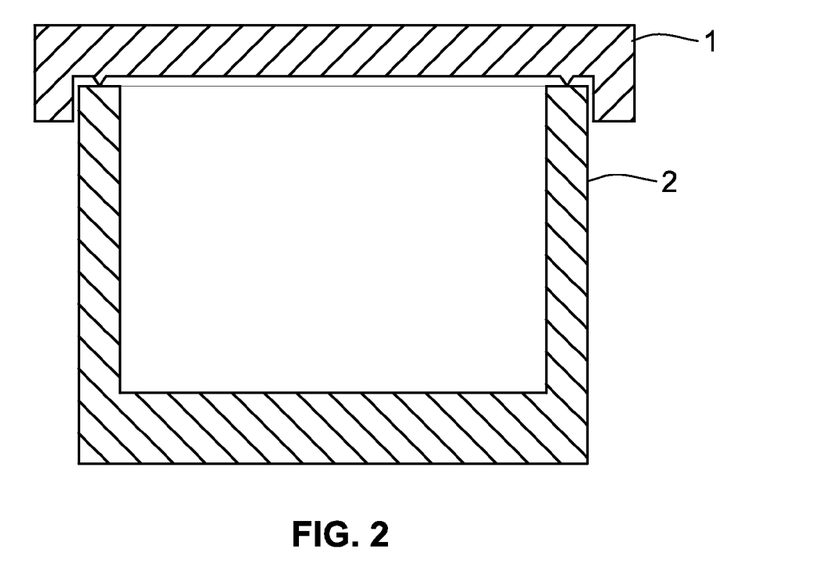
FIG. 2 is an enlarged sectional view of the parts of FIG. 1 positioned for ultrasonic welding.
Figure 3:
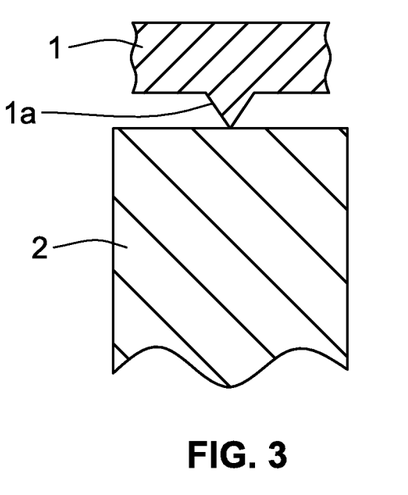
FIG. 3 is a further enlarged sectional view of those portions of the parts of FIG. 2.

One of the most commonly used weld joint designs is the triangular energy director, consisting of a ridge of material having a triangular profile on one of the parts and a flat surface on the mating part. This joint design is illustrated in the example of FIGS. 1-3. FIG. 1 shows the two parts, with part 1 containing the energy director 1a and part 2 containing the flat surface. FIG. 2 is a cross-sectional view of the parts in position for welding, where the tip of the energy director of part 1 is in contact with the flat surface of part 2. FIG. 3 is an enlarged view of the energy director area of the section view of FIG. 2. The tip of the energy director is either sharp or slightly radiused, so as to provide a small contact area between the parts, allowing the ultrasonic vibrations to be focused at the beginning of the weld to initiate melting. The triangular energy director, generally referred to in the industry as simply "energy director," and its applications are detailed in a number of technical publications, such as the "Handbook of Plastic Joining" (Second Edition, Edited by Michael J. Troughton).

While the triangular energy director design has been in commercial use for many years, several undesirable characteristics are associated with this joint shape. One of the most significant factors is the high manufacturing cost of the part mold containing the energy director. In order to create the sharp edge at the tip, the energy director geometry is typically produced by either electrical discharge machining (EDM) on a single piece of steel, or splitting the mold into two pieces along the center of the energy director with a closely controlled gap between them. The former technique is time-consuming and involves dedicated tooling, and the latter requires tight machining tolerances. Consequently, the cost of mold fabrication is relatively high. Another disadvantage is the challenge in molding parts with energy directors. Specifically, it can be difficult to completely fill the sharp tip with plastic during the molding process. Incomplete or inconsistent energy directors can in turn lead to weaker ultrasonic welds, or welds that are not uniform along the entire joint path. Still another drawback is the susceptibility of the energy director to being damaged prior to welding. After the plastic parts are molded, they are often packaged in bulk and transported to the welding station. If the packaging method permits the energy directors to come in contact with other parts, the energy director rib can be distorted or crushed, sometimes in a highly localized manner. Flaws of this type can result in areas where there is an insufficient amount of material to produce a continuous weld, which is especially problematic in cases where a hermetic seal is required.

SUMMARY

In accordance with one embodiment, an ultrasonic welding system is provided for joining first and second thermoplastic parts. At least one energy director is formed on at least one surface of the first thermoplastic part, with the energy director projecting from the surface of the first thermoplastic part toward an opposed surface of the second thermoplastic part. The distal end portion of the energy director has a curved surface that initially engages the opposed surface of the second thermoplastic part when the first and second parts are brought into engagement with each other. The first and second thermoplastic parts are ultrasonically welded by pressing the parts together while vibrating at least the first part in a direction parallel to the direction of projection of the energy director.

In one implementation, a longitudinal section taken through the energy director, in a direction normal to the surface to be engaged by the director, has a curved profile at the distal end of the director. For example, the curved profile may be a section of a circle having a center that is substantially coincident with the surface of said first thermoplastic part from which the energy director protrudes, or spaced away from the surface of the first thermoplastic part from which the energy director protrudes, either in a direction opposite the direction of projection of the energy director or in the same direction as the direction of projection of the energy director. A pair of substantially flat side walls may be joined to opposite ends of the curved profile, with the side walls diverging from each other as they extend away from the curved profile toward the surface of the thermoplastic part on which the energy director is formed. The maximum width of the curved profile is preferably at least half of the maximum width of the longitudinal section taken through the energy director, and the curved profile preferably has a radius of curvature of at least 0.20 mm. at the distal end of the energy director.

In another embodiment, a longitudinal section taken through the energy director, in a direction normal to the surface to be engaged by the director, has a substantially flat distal end and a pair of substantially flat side walls joined to opposite ends of the substantially flat distal end, the substantially flat side walls diverging from each other as they extend away from the distal end toward the surface of the first thermoplastic part to be joined to the second thermoplastic part.

The ultrasonic welding method for joining the first and second thermoplastic parts, comprises forming at least one energy director on at least one surface of the first thermoplastic part, the energy director projecting from the surface of the first thermoplastic part toward an opposed surface of the second thermoplastic part, the end portion of the energy director having a curved or flat surface that initially engages the opposed surface when the first and second thermoplastic parts are brought into engagement with each other, and ultrasonically welding the first and second thermoplastic parts by pressing the parts together while vibrating at least the first part in a direction parallel to the direction of projection of the energy director.

The energy director is preferably formed in a mold in which the cavity that forms the energy director is formed by ball end milling.

In another embodiment, an ultrasonic welding method for joining a film or fabric to a rigid thermoplastic part comprises forming at least one energy director on at least one surface of a rigid thermoplastic part, with the energy director projecting from the surface of the rigid thermoplastic part toward an opposed film or fabric, the end portion of the energy director having a curved surface that initially engages the film or fabric when the film or fabric is brought into engagement with the rigid thermoplastic part; and ultrasonically welding the film or fabric to the rigid thermoplastic part by pressing the film or fabric and the rigid thermoplastic part together while vibrating at least one of the rigid thermoplastic part or the film or fabric in a direction parallel to the direction of projection of the energy director.

BRIEF DESCRIPTION OF THE DRAWINGS

The invention may best be understood by reference to the following description taken in conjunction with the accompanying drawings, in which.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 4:
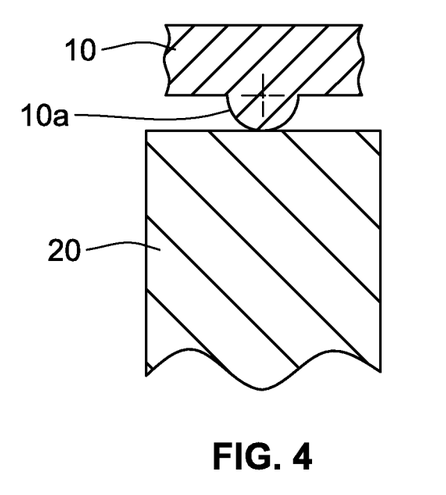
FIG. 4 is a sectional view of parts containing a round energy director, where the center of the energy director circular section is coincident with the part surface from which it protrudes.
Figure 5A:
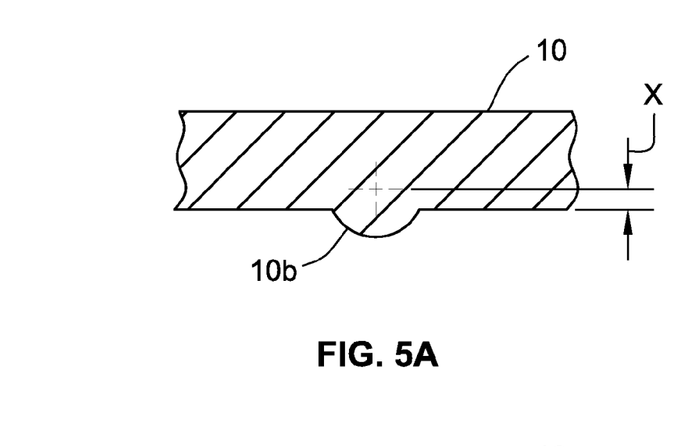
FIG. 5A and FIG. 5B are sectional views of parts containing energy directors having round distal end surfaces that are sections of a circle having a center that is either recessed below the part surface from which the energy director protrudes (FIG. 5A) or is extended forward of the part surface on which the energy director is formed (FIG. 5B).
Figure 5B:
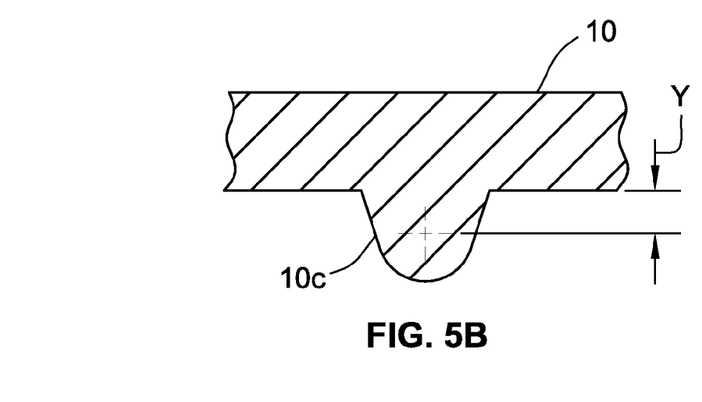

In the sectional view in FIG. 4, a first plastic part 10 containing an energy director 10a is to be welded to a second plastic part 20. In this embodiment, the energy director 10a projecting from the first part 10 has a curved profile at the distal end of the director. In this example, the curved profile has a semi-circular shape, with the center of the circle substantially coincident with the surface of the first thermoplastic part 10 from which the energy director 10a protrudes. Alternatively, the center of the circle can be offset (spaced away) from the surface of the first thermoplastic part from which said energy director protrudes. In FIG. 5A, the center of the circle of the energy director 10b is offset in a direction opposite the direction of projection of said energy director by a distance X. In FIG. 5B, the center of the circle of the energy director 10c is offset in a direction opposite the direction of projection of said energy director by a distance Y. and the profile of the energy director 10c additionally includes flat, tapered sides emanating from the flat surface of the part 10 and terminating tangentially at the generally semi-circular section of the distal end portion of the energy director. The diameter of the semi-circular portion of the profile of the energy director is preferably at least one-half of the width of the energy director in the plane of the flat part surface from which energy director emanates. Although in the illustrated embodiments the surfaces of the part 10 adjacent the energy directors are flat surfaces, it will be understood that those adjacent part surfaces could be non-flat surfaces.

Figure 5C:
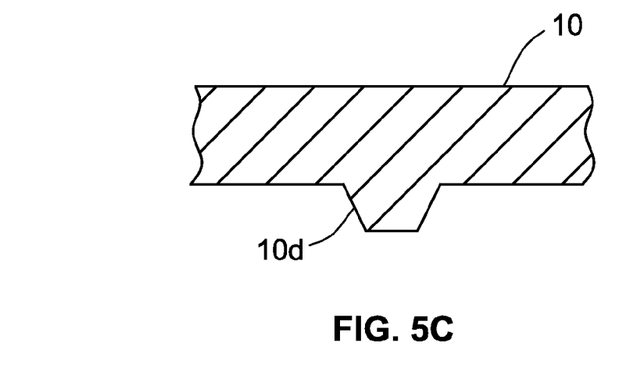
FIG. 5C and FIG. 5D are sectional views of parts having energy directors with flat distal ends, where the flat end surface of the energy director terminates at either a pair of side walls that diverge from each other as they extend toward the surface of the part on which the energy director is formed (FIG. 5C), or at a pair of beveled corners that merge with a pair of side walls that diverge from each other as they extend toward the surface of the part on which the energy director is formed
Figure 5D:
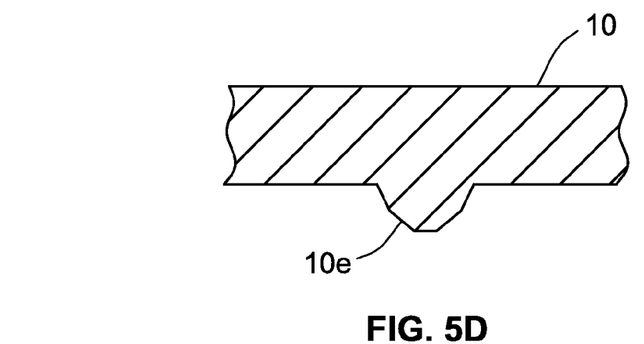

In FIG. 5C, the energy director 10d has a trapezoidal cross-section profile, forming a flat surface on the distal end of the energy director. FIG. 5D illustrates a modified version of the energy director shown in FIG. 5C, in which the corners of the trapezoid at the distal end of the energy director 10e are truncated, forming a pair of beveled surfaces.

Figure 6A:
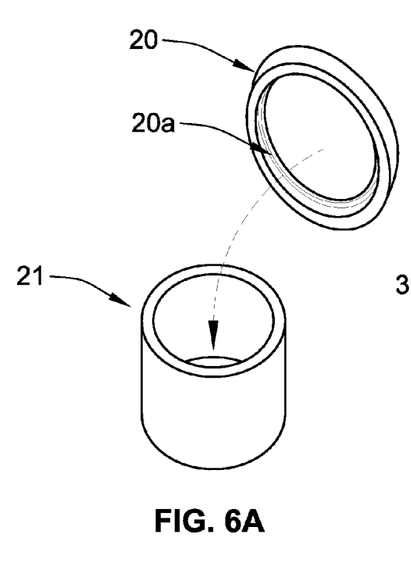
FIGS. 6A and 6B are a pair of exploded perspective views of parts containing the round energy directors.
Figure 6B:
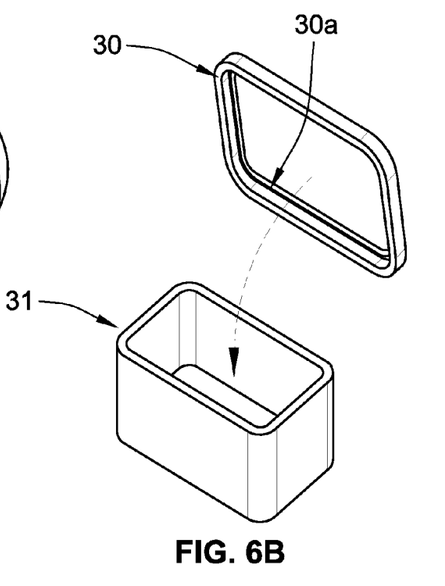

The energy director with the curved or flat distal end profile is suitable for use with the same wide variety of part geometries as previous energy directors. Example designs of simple parts containing the round energy director joint are illustrated in FIG. 6, where FIG. 6A shows parts 20, 21 with a circular joint path 20a, and FIG. 6B shows parts 30, 31 with a rectangular joint path 30a. In both configurations, the energy director in the joint path is integral to the first part 20 or 30, with the second part 21 or 31 containing the flat mating surface.

Figure 7:
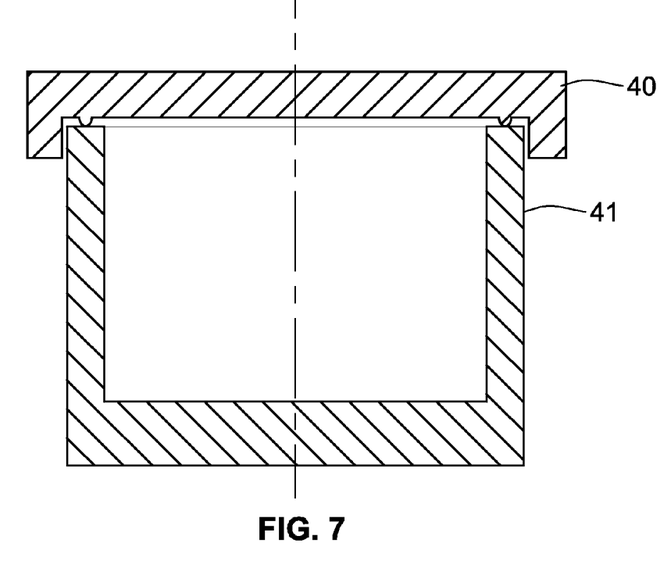
FIG. 7 is a cross-sectional view of the parts of FIG. 6A.

FIG. 7 is a cross-sectional view of FIG. 6A, showing the parts in position for welding, where the tip of the energy director of part 40 is in contact with the flat surface of part 41. Although FIG. 6 and FIG. 7 depict the energy director as being integral to the first part, it can alternatively be incorporated into the second part, with the first part containing the flat surface.

While preserving the characteristic of providing a small contact area between the parts as the weld is initiated, the energy director with the curved or flat distal end profile offers a number of advantages compared to the triangular design. First, the time and expense of fabricating the mold are significantly reduced. The energy director with the curved or flat distal end profile can be directly milled into a single piece of steel using standard ball end mills, which eliminates the need for special tooling or very tight machining tolerances. In addition, the energy director with the curved or flat distal end profile permits the use of cutting tools with larger diameters, reducing machining time and spindle rotational speed requirements of the machine tool. Second, the part molding process is facilitated by the fact that molten plastic will fill the cavity of the energy director with the curved or flat distal end profile more readily than the tip of the triangular energy director, leading to improvements in weld joint uniformity and part-to-part consistency, and ultimately resulting in more uniform and consistent weld results. Third, the energy director with the curved or flat distal end profile is more robust than a comparably-sized triangular energy director and therefore less prone to damage when parts are handled, packaged and transported between the time when they are molded and the time when they are welded. With a smaller risk of compromising the energy director, especially at its tip, production yields can be improved.

The benefits of the energy director with the curved or flat distal end profile with regard to weld quality have been confirmed by an experiment consisting of welding two sets of round polycarbonate samples similar to the parts shown in FIG. 1. In the first set, the cap (part 1 in FIG. 1) contained an energy director having the profile illustrated in FIG. 4, with a tip radius of 0.41 mm. In the second set, the cap contained a triangular energy director as shown in FIG. 3, with a height of 0.38 mm and a tip angle of 90°. The base (part 2 in FIG. 1) was identical in both sets. Using a servo-driven ultrasonic press of the type described in U.S. Pat. No. 7,819,158 and employing the delayed motion technique described in U.S. Pat. No. 8,052,816, welding parameters were determined for each sample set to yield optimum weld strength (i.e., tensile failure load) while maintaining the same weld collapse distance. Using the optimized parameters for each set, a statistically significant number of samples was welded and subsequently pull-tested to measure the weld strength. For the first energy director set, the average weld strength and its standard deviation expressed as a percentage of the average were 5220 N and 5.8%, respectively, whereas for the triangular energy director set, the results were 4770 N and 10.6%, respectively.

Figure 8:
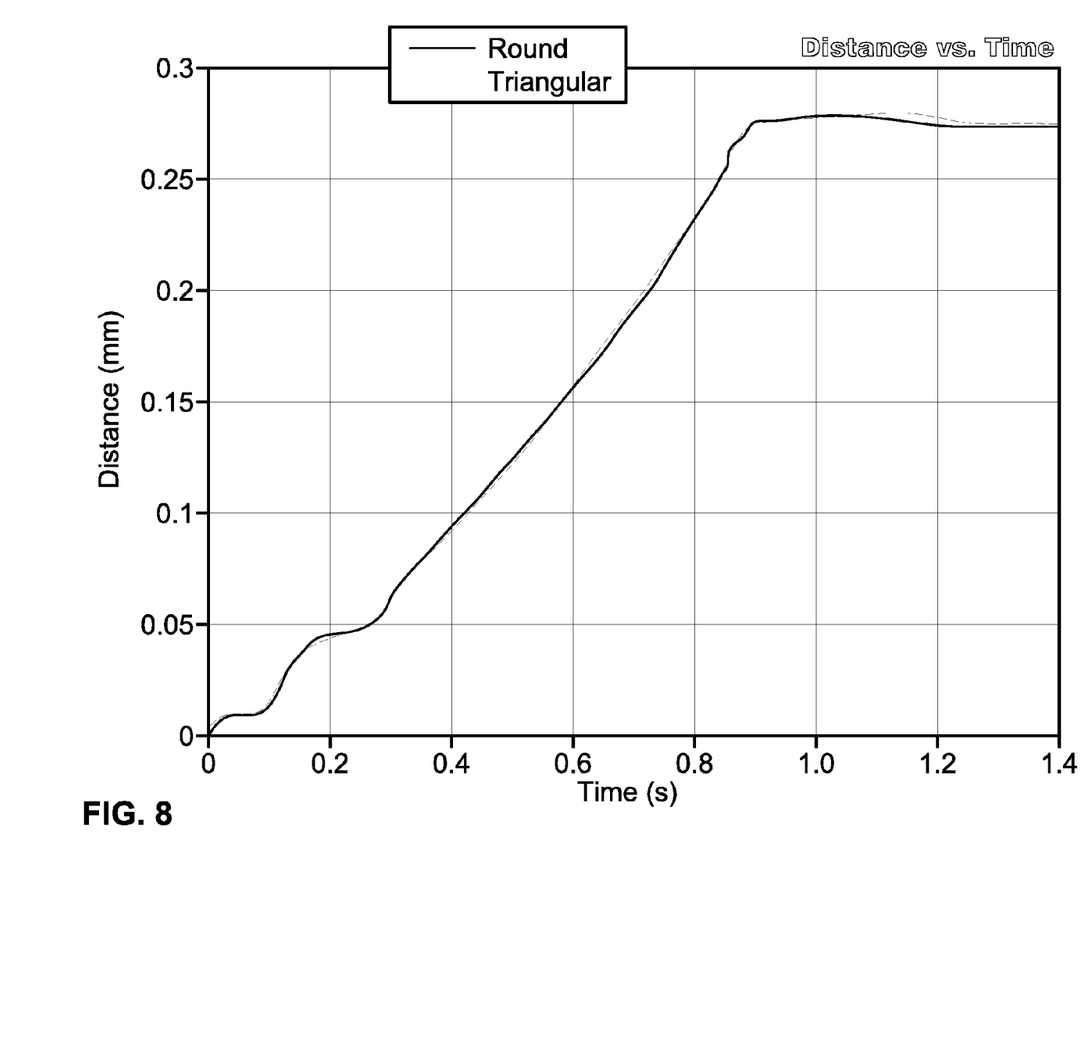
FIG. 8 is a pair of graphs of Distance vs. Time for two representative samples welded during an experiment comparing the weld quality of parts containing a round energy director to those containing a triangular energy director.
Figure 9:
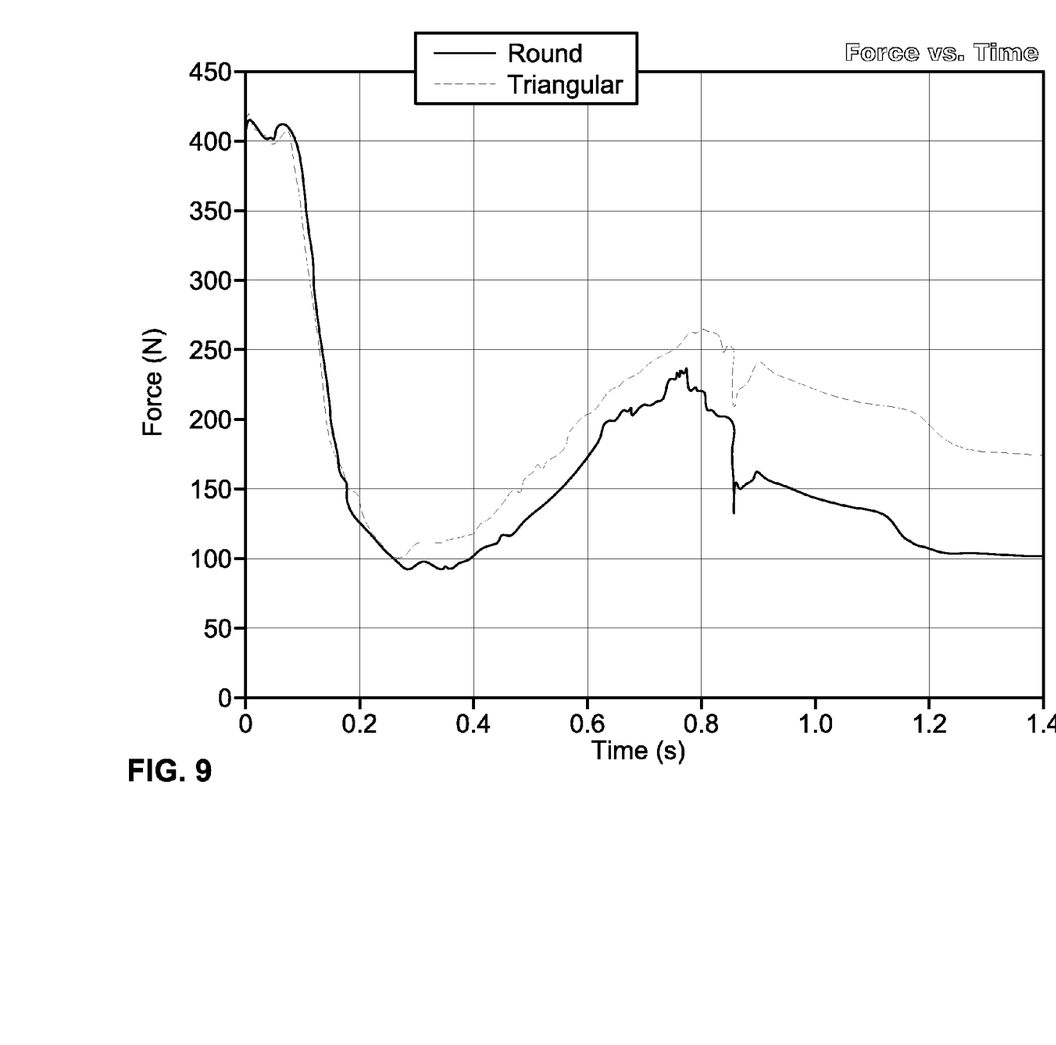
FIG. 9 is a pair of graphs of Force vs. Time for the samples noted in FIG. 8.
Figure 10:
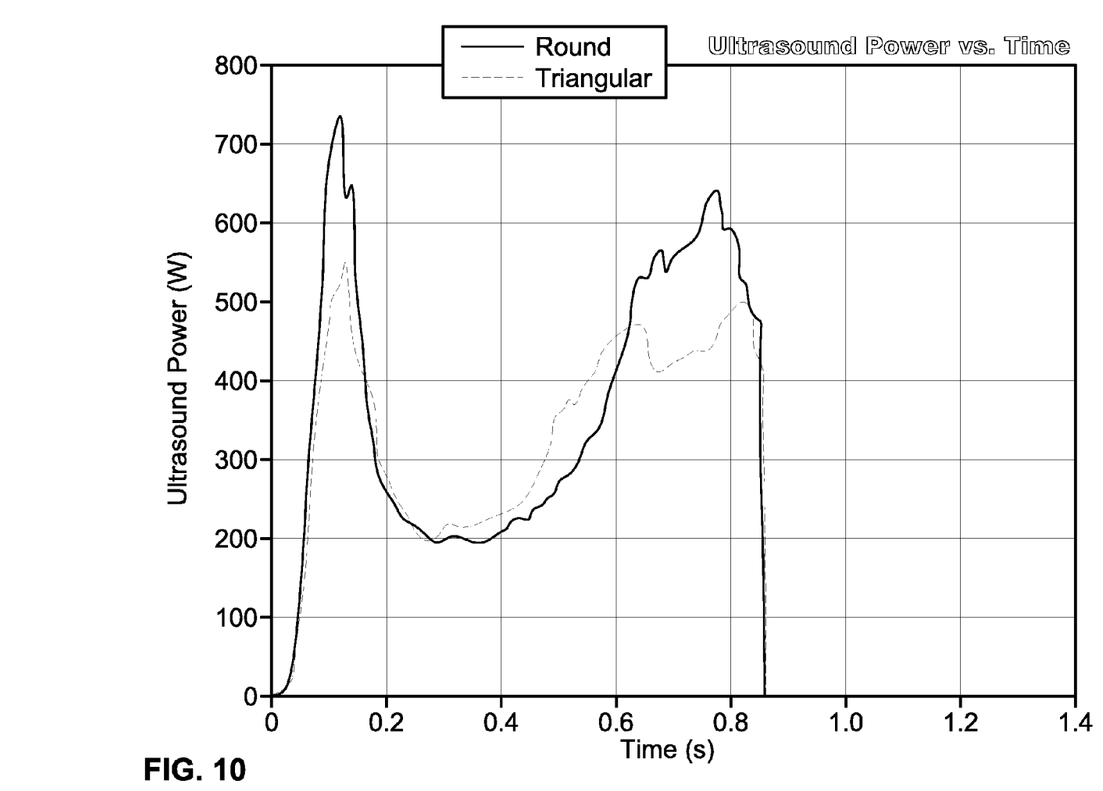
FIG. 10 is a pair of graphs of Ultrasound Power vs. Time for the samples noted in FIG. 8.

FIGS. 8-10 are graphs of several parameters for representative samples welded in the above experiment, where FIG. 8 shows Distance vs. Time, FIG. 9 shows Force vs. Time, and FIG. 10 shows Ultrasound Power vs. Time, for one sample containing the energy director with the round end profile and one sample containing the triangular energy director. On each graph, the ultrasound vibrations were initiated at Time=0 s.

The results of this experiment confirm that the energy director of the present invention yields more consistent results and higher weld strengths. It should be noted that a servo-driven ultrasonic press employing the aforementioned delayed motion technique is particularly well-suited for welding parts with the energy director with the curved or flat distal end profile, due to its ability to suspend motion until initial melting of the plastic material occurs as well as to change forces rapidly during the weld process.

The round energy directors described above are also useful for welding a film or fabric to the rigid thermoplastic part on which the energy director is formed. (Welding film to rigid plastic is popular in the packaging industry.) The film or fabric is typically positioned for ultrasonic welding by being placed in tension directly over the rigid thermoplastic part on which the round energy director is formed. Alternatively, the film or fabric can be supported on a surface that does not adhere to the rigid thermoplastic part on which the energy director is formed. Ultrasonic vibrations emanating from the horn (sonotrode) for welding the film or fabric to the rigid part can be applied to either the film side or the rigid part side.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An ultrasonic welding method for joining first and second thermoplastic parts, said method comprising
    forming at least one energy director as an integral part of at least one surface of said first thermoplastic part, said energy director projecting from said surface of said first thermoplastic part toward an opposed surface of said second thermoplastic part, the end portion of said energy director having a convex curved surface so that the central portion of said convex curved surface initially engages said opposed surface when said first and second thermoplastic parts are brought into engagement with each other, and
    ultrasonically welding said first and second thermoplastic parts by
        pressing said first and second thermoplastic parts together using a servo-driven ultrasonic press while vibrating at least said first part in a direction parallel to the direction of projection of said energy director to melt said energy director and the adjacent surface of said first thermoplastic part on which said energy director is formed, wherein a longitudinal section taken through said energy director, in a direction normal to the surface to be engaged by said director, has a curved profile at the distal end of said director, said curved profile having a radius of curvature of at least 0.20 mm at the distal end of said energy director, and
        advancing said parts toward each other after an initial programmed delay interval following the start of said vibrating using the servo-driven ultrasonic press to change forces or speed rapidly during the ultrasonically welding after the programmed delay interval to promote initial melting of the energy director and thereafter a uniform and consistent welt joint with an optimum weld strength.

2. The ultrasonic welding method of claim 1 in which a longitudinal section taken through said energy director, in a direction normal to the surface to be engaged by said director, has a curved profile at the distal end of said director.

3. The ultrasonic welding method of claim 2 in which said curved profile is a section of a circle.

4. The ultrasonic welding method of claim 3 in which the center of said circle is substantially coincident with the surface of said first thermoplastic part from which said energy director protrudes.

5. The ultrasonic welding method of claim 3 in which the center of said circle is spaced away from the surface of said first thermoplastic part from which said energy director protrudes, in a direction opposite the direction of projection of said energy director.

6. The ultrasonic welding method of claim 3 in which the center of said circle is spaced away from the surface of said first thermoplastic part from which said energy director protrudes, in the same direction as the direction of projection of said energy director, and which includes a pair of substantially flat side walls joined to opposite ends of said curved profile, said substantially flat side walls diverging from each other as they extend away from said curved profile toward the surface of said first thermoplastic part to be joined to said second thermoplastic part.

7. The ultrasonic welding method of claim 2 in which the maximum width of said curved profile is at least half of the maximum width of said longitudinal section taken through said energy director.

8. The ultrasonic welding method of claim 2 in which said curved profile has the radius of curvature of at least 0.20 mm at the distal end of said energy director.

9. The ultrasonic welding method of claim 1 in which said energy director is formed in a mold in which the cavity that forms said energy director is formed by ball end milling.

10. An ultrasonic welding method for joining a film or fabric to a rigid thermoplastic part, said method comprising
forming at least one energy director as an integral part of at least one surface of said rigid thermoplastic part, said energy director projecting from said surface of said rigid thermoplastic part toward an opposed surface of said film or fabric, the end portion of said energy director having a convex curved surface so that the central portion of said convex curved surface initially engages said film or fabric when said film or fabric is brought into engagement with said rigid thermoplastic part, wherein a longitudinal section taken through said energy director, in a direction normal to the surface to be engaged by said director, has a curved profile at the distal end of said director, said curved profile having a radius of curvature of at least 0.20 mm at the distal end of said energy director, and
ultrasonically welding said film or fabric to said rigid thermoplastic part by
pressing said film or fabric and said rigid thermoplastic part together using a servo-driven ultrasonic press while vibrating at least said rigid thermoplastic part or said film or fabric in a direction parallel to the direction of projection of said energy director to melt said energy director and the adjacent surface of said rigid thermoplastic part on which said energy director is formed, and
advancing said parts toward each other after an initial programmed delay interval following the start of said vibrating using the servo-driven ultrasonic press to change forces or speed rapidly during the ultrasonically welding after the programmed delay interval to promote initial melting of said energy director and thereafter a uniform and consistent welt joint with an optimum weld strength.

11. The method of claim 10 in which said film or fabric is supported on a rigid surface made of a material that will not adhere to said rigid thermoplastic part.

12. An ultrasonic welding method for joining first and second thermoplastic parts, said method comprising
forming at least one energy director as an integral part of at least one surface of said first thermoplastic part, said energy director projecting from said surface of said first thermoplastic part toward an opposed surface of said second thermoplastic part, the end portion of said energy director having a trapezoidal surface so that the central portion of said trapezoidal surface initially engages said opposed surface when said first and second thermoplastic parts are brought into engagement with each other, and
ultrasonically welding said first and second thermoplastic parts by
pressing said first and second thermoplastic parts together using a servo-driven ultrasonic press while vibrating at least said first part in a direction parallel to the direction of projection of said energy director to melt said energy director and the adjacent surface of said first thermoplastic part on which said energy director is formed, wherein said energy director has a non-pointed profile at a distal end of said energy director, and
advancing said parts toward each other after an initial programmed delay interval following the start of said vibrating using the servo-driven ultrasonic press to change forces or speed rapidly during the ultrasonically welding after the programmed delay interval to promote initial melting of the energy director and thereafter a uniform and consistent welt joint with an optimum weld strength.

13. The ultrasonic welding method of claim 1 in which said trapezoidal energy director has truncated corners separated by a flat central end surface on said energy director.

* * * * *

UNITED STATES PATENT AND TRADEMARK OFFICE
CERTIFICATE OF CORRECTION

PATENT NO. : 9,873,225 B2
APPLICATION NO. : 14/500416
DATED : January 23, 2018
INVENTOR(S) : Leo Klinstein et al.

Page 1 of 1

It is certified that error appears in the above-identified patent and that said Letters Patent is hereby corrected as shown below:

In the Claims

At Column 6, Lines 66-67 (Claim 1, Lines 31-32), please delete "ultrasoni-cally" and insert --ultrasonic-- therefor.

At Column 7, Line 2 (Claim 1, Line 34), please delete "welt" and insert --weld-- therefor.

At Column 8, Line 14 (Claim 10, Lines 31-32), please delete "ultrasoni-cally" and insert --ultrasonic-- therefor.

At Column 8, Line 16 (Claim 10, Line 34), please delete "welt" and insert --weld-- therefor.

At Column 8, Lines 48-49 (Claim 12, Lines 27-28), please delete "ultrasoni-cally" and insert --ultrasonic-- therefor.

At Column 8, approximately Line 50 (Claim 12, Line 30), please delete "welt" and insert --weld-- therefor.

At Column 8, Line 52 (Claim 13, Line 1), please delete "claim 1" and insert --Claim 12-- therefor.

Signed and Sealed this
Twelfth Day of June, 2018

Andrei Iancu
*Director of the United States Patent and Trademark Office*